United States Patent [19]
Takamatsu et al.

[11] Patent Number: 5,381,187
[45] Date of Patent: Jan. 10, 1995

[54] IMAGE DISPLAY APPARATUS

[75] Inventors: Toshiaki Takamatsu, Yamatokoriyama; Shinichi Ogawa, Nara; Masao Yoshikawa, Gose; Hiroshi Hamada; Noriko Watanabe, both of Nara; Fumiaki Funada, Yamatokoriyama, all of Japan

[73] Assignee: Sharp Kabushiki Kaisha, Osaka, Japan

[21] Appl. No.: 833,612

[22] Filed: Feb. 13, 1992

Related U.S. Application Data

[63] Continuation of Ser. No. 552,750, Jul. 16, 1990, abandoned.

[30] Foreign Application Priority Data

| Jul. 19, 1989 | [JP] | Japan | 1-187715 |
| Jul. 31, 1989 | [JP] | Japan | 1-199723 |
| Dec. 15, 1989 | [JP] | Japan | 1-326536 |
| Dec. 15, 1989 | [JP] | Japan | 1-326538 |

[51] Int. Cl.⁶ .................... H04N 5/74; H04N 9/31
[52] U.S. Cl. .................... 348/759; 348/760; 348/761
[58] Field of Search .................... 358/60, 61, 58, 59, 358/62, 63, 231, 232, 233, 234, 212; 359/40, 41, 49, 54, 71, 290, 319, 53, 62, 74, 87, 93; H04N 9/31, 5/74; G02F 1/13; 348/744, 751, 761, 759, 760, 766, 790, 791

[56] References Cited

U.S. PATENT DOCUMENTS

| 4,715,686 | 12/1987 | Iwashita et al. | 350/339 R |
| 4,790,632 | 12/1988 | Hiyakawa et al. | 350/334 |
| 4,836,652 | 6/1989 | Oishi et al. | 350/334 |
| 4,917,464 | 4/1990 | Conner | 350/335 |
| 4,946,252 | 8/1990 | Sugawara | 350/167 |
| 5,052,783 | 10/1991 | Hamada | 359/41 |

FOREIGN PATENT DOCUMENTS

| 2912467 | 10/1980 | Germany . |
| 60-165621 | 8/1985 | Japan . |
| 60-165622 | 8/1985 | Japan . |
| 60-165623 | 8/1985 | Japan . |
| 60-165624 | 8/1985 | Japan . |
| 60-262131 | 12/1985 | Japan . |
| 61-11788 | 1/1986 | Japan . |
| 0284731 | 12/1986 | Japan | 359/40 |
| 62-203126 | 9/1987 | Japan . |
| 62-267723 | 11/1987 | Japan . |
| 62-267791 | 11/1987 | Japan . |
| 2-1816 | 1/1990 | Japan . |
| 2-12224 | 1/1990 | Japan . |

OTHER PUBLICATIONS

Patent Abstracts of Japan, vol. 13, No. 222, 24 May 1989 & JP-A-1 35 416, (Matsushita) Jun. 02, 1989 (including translation).
Patent Abstracts of Japan, vol. 11, No. 303, 3 Oct. 1987 & JP A-62 94 826, (Seiko Epson) Jan. 05, 1987 (including translation).
Research Disclosure, vol. 276, Apr. 1987, pp. 238-239, abstract No. 27675, Emsworth, "Color laser-addressed liquid crystal display".
Japanese Laid-Open Patent Publication No. 61-208080, Sep. 16, 1986, Niki et al (partial translation).

Primary Examiner—James J. Groody
Assistant Examiner—Michael H. Lee
Attorney, Agent, or Firm—Nixon & Vanderhye .

[57] ABSTRACT

An image display apparatus is disclosed which includes: an optical system including a light source and at least one projection lens; a display means for forming a display image, the display means including a non-luminescent display panel and a microlens array disposed on the light-incidence side of the display panel; and at least one projection lens for projecting the display image; wherein the display panel and the microlens array are combined with each other by means of an adhesive made of a transparent material. In cases where the microlens array is provided with color filters which are arranged so as to correspond to the microlenses of this array, the image display apparatus can provide a bright display of color images with an improved contrast. Moreover, when the display panel and the microlens array are combined with each other by means of an adhesive containing spacers, the image display apparatus has a high thermal reliability.

8 Claims, 8 Drawing Sheets

IMAGE DISPLAY APPARATUS

This is a continuation of application Ser. No. 07/552,750, filed Jul. 16, 1990, now abandoned.

BACKGROUND OF THE INVENTION

1. Field of the invention

This invention relates to an image display apparatus of the projection type.

2. Description of the prior art

In recent years, for the purpose of attaining a relatively large display of images with a compact, light-weight display apparatus, projection-type image display apparatuses that project the image on a screen have been used which employ a non-luminescent display panel of the transmission type to form the image by projecting light on the display panel from a light source behind the display panel.

The non-luminescent display panel does not emit light itself, but rather its transmittance is changed by a driving signal and the image is displayed by modulating the strength of the light from a light source provided separately. Examples of non-luminescent display panels are liquid crystal display panels, electrochromic display panels, and transmissive-type ceramic panels (e.g., display panels using lead lanthanum zirconate titanate (PLZT) in display elements). In particular, liquid-crystal display panels have been widely used in portable televisions, word processors, etc.

In these display panels, the smallest display units, referred to as picture elements, are arranged in a regular pattern and the image is displayed by the application of independent driving voltages to each picture element. The methods used to apply independent driving voltages to each picture element include the simple matrix drive system and the active matrix drive system.

For the purpose of obtaining a display of color images, a three-panel system is used which produces the color image by superposing monochrome images which are formed by three display panels corresponding to the three primary colors (i.e., red, green, and blue), or a one-panel system is used which performs a color display by arranging three kinds of color filters corresponding to the three primary colors in a mosaic or striped pattern (abbreviated to a color filter below) so as to face the respective picture elements of a display panel.

In the three-panel system, it is difficult to produce a compact, lightweight image display apparatus because of the needs for both the three display panels and an optical system for superposing the three monochrome images corresponding to the three primary colors.

On the other hand, it is relatively simple to produce a compact, lightweight image display apparatus and attain lower production costs with the one-panel system. However, in order to obtain a resolution equal to that of the three-panel system when colorizing the image with the one-panel system, three times as many picture elements are required for only one panel. Therefore, each picture element should be made smaller and the density of picture elements should be increased.

When using a liquid crystal display panel of a matrix-drive system with a color filter which transmits the light of the three primary colors (i.e., red, green, and blue) at each picture element, the switching elements and the various signal lines should be provided between the picture elements. Particularly, when using a liquid crystal display panel of an active-matrix drive system with switching elements (e.g., thin-film transistors or metal-insulator-metal (MIM) elements), separate display electrodes connected to these switching elements, driving signal lines which supply the driving signals to these display electrodes, and scanning signal lines which supply the control signals which scan the above switching elements. Therefore, the percentage per unit area (apertre ratio) of the area contributing to display (i,e., the area in which the display electrodes are formed) is decreased as compared to the area not contributing to display (i.e., the area in which the various signal lines and the switching elements are formed).

When displaying color images with a one-panel display system, it is necessary to make the display electrodes smaller and increase the density of picture elements as described above, so that the shading area which does not contribute to display becomes relatively large, thus further reducing the aperture ratio.

This decrease in the aperture ratio reduces the amount of light transmitted by the liquid crystal display panel, thus resulting in a darker display image even if the same light source is used.

To solve this problem, various methods have been disclosed in the Japanese Laid-open Patent Publications Nos. 60-165621 to 60-165624 and 60-262131, which improve the brightness of the display image by using a microlens array to converge the light incident upon the liquid crystal panel, on the picture element areas (i.e., display electrodes).

The following methods have been proposed for forming microlens arrays.

(1) A molding method in which a metal mold is used to form a synthetic resin material or glass into a microlens array.

(2) A method in which convex lenses in a microlens array are formed by utilizing a phenomenon that when a specific type of photosensitive resin is exposed to light in a pattern corresponding to the microlens array, the non-reacted photosensitive resin moves from the non-exposed parts to the exposed parts and the exposed parts swells up to form the convex lenses.

(3) A method in which convex lenses in a microlens array are formed by using a known photolithographic technique to pattern a thermoplastic resin in a plate shape corresponding to the microlens array and then heating the resin to a temperature above its softening point to give it flowability and cause curving at the edges.

(4) A method in which convex lenses in a microlens array are formed by performing the proximity printing on a photosensitive resin and distributing the amount of photoreacted material according to the indistinctness of the transfer image on the photosensitive resin at the edges of the mask used in the proximity printing.

(5) A method in which a configuration equivalent to a microlens array is obtained by irradiating light with an intensity distribution on a photosensitive resin to form a refractive index distribution corresponding to the intensity of the light.

(6) A method in which a configuration equivalent to a microlens array is obtained by forming a refractive index distribution on glass or other transparent substrates using a selective ion diffusion technique.

(7) A method in which convex lenses in a microlens array are formed by utilizing the contraction which accompanies crystallization when light is applied to a photosensitive glass.

Alternatively, methods in which a microlens array is combined with a color filter by selectively colorizing the microlens array (i.e., with the primary colors of red, green, and blue) using a pigment or dye have been disclosed in the Japanese Laid-open Patent Publications Nos. 61-208080 and 62-267791.

In the methods mentioned above, attempts should be made to control the spectral characteristics as the function of the color filter by selecting the shape thereof, but since the color filter also functions as a microlens array, it is difficult to change the shape which is established on the basis of the required lens characteristics. Also, since the transmittance varies according to the distribution of the thickness of the microlens itself (i.e., the transmittance decreases near the center of each microlens, whereas light in the wavelength band which should be absorbed is allowed to pass near the edge of each microlens), so that it is difficult to obtain the desired spectral characteristics. Moreover, the range of materials that can be used to form microlens arrays is relatively narrow from the viewpoint of such factors as refractive index, molecular structure, and melting point. Furthermore, since the materials that can be used to form microlenses are limited, the range of pigments and dyes that can be used is greatly limited. Therefore, it is desirable to provide a color filter separate from the microlens array.

When a microlens array is made using any one of the methods (1) through (7) above, the round micro-lenses are arranged with a predetermined spacing to prevent them from overlapping each other. In such a type of microlens arrays, there is a space remaining between the adjacent microlenses which does not contribute to convergence of light, so that all of the light incident upon the microlens array cannot be converged and used for display.

In view of this problem, it is thought that the converging capacity can be raised by changing the shape of each of the microlenses so that there is no space between them. For example, when the picture elements are arranged in an orthogonal lattice pattern, the microlenses can be packed together without space between them by giving each of the microlenses a rectangular shape corresponding to the picture element pitch.

In most cases, the picture elements of a liquid crystal display device are arranged in a striped matrix, diagonal matrix, or delta matrix. The microlenses are arranged according to the picture element matrix in the liquid crystal display panel. In the delta matrix, the picture elements in the odd and even numbered rows are mutually shifted half of the picture element pitch (in a color display panel, picture elements of the same color are shifted 1.5, times the picture element pitch). The delta matrix has the advantages that the space resolution thereof has little anisotropy, the three primary colors are well mixed with each other, and the highest display quality is obtained in cases where an equal number of picture elements are used. Therefore, the delta matrix is employed in most portable liquid crystal televisions, and the same effect can also be obtained in the image display devices of the projection type.

When the picture elements are arranged in a delta matrix, the microlenses can be packed together with no space between them whether they are rectangular or hexagonal. When the microlenses are made using the method (1) above, the contour thereof can be divided into rectangles or hexagons without losing the rotational symmetry of the shape, so that there is almost no difference in the converging capacity between These microlenses.

However, when microlenses with a non-round contour are made using a method other than the method (1) above, by forming the exposure pattern into the desired shape, the rotational symmetry of the shape is lost, so that astigmatism occurs, thus increasing the size of or distorting the diameter of the convergence spot. If this causes the convergence spot to protrude from the opening of the picture element, then the converging capacity decreases. Other than the method (1) above, regardless of the method used to make the microlens array, the degree of the astigmatism is greater with rectangular lenses than with hexagonal lenses. This is because the degree of astigmatism changes according to the shift in the concave/convex shape of the microlenses or in their refractive index distribution from rotational symmetry.

Therefore, it is generally most effective to use a microlens array with a hexagonal contour for a liquid crystal display panel with picture elements in a delta matrix.

When forming a microlens array by the ion diffusion method (6) above so that there is no space between microlenses, the ions are diffused from a diffusion window much smaller than the diameter of the microlenses to be formed. Therefore, the shape of the microlenses naturally becomes hexagonal.

FIG. 8 shows the relationship between the shapes of conventional color filters and microlenses. In such a combination, the color filters 316R, 316G, and 316B are rectangular, so that white light or light of another color escapes from those parts protruding from the microlenses 314. This reduces the display contrast or the mixing of colors lessens the clarity, therefore, it is desirable to make the shape of the color filters the same as that of the microlenses.

In the case of image display devices having a liquid crystal display panel combined with a microlens array, both of the liquid-display panel and microlens array should be positioned near each other so that the microlenses in the microlens array individually corresponds to the picture elements in the liquid crystal display panel. Moreover, when performing a display of color images, alignment is required between the color filter and the microlens.

However, in such an image display device, it is difficult to hold each of the parts at the respective predetermined position with high accuracy by mechanical means, and production costs are increased when attempts are made to increase accuracy. Moreover, if there is a layer of air between the liquid crystal panel, the microlens array, and the color filter, image quality will deteriorate because of loss arising from the interference, surface reflection, and scattering of light. To prevent loss arising from the interference, surface reflection, and scattering of light, these parts can be combined with each other by means of an adhesive.

In general, techniques for allowing two or more substrates to adhere together are used to combine optical parts with each other or to produce liquid crystal display devices. An ultraviolet setting resin is usually used to combine optical parts such as achromatic composite lenses, various types of prisms, and deflecting beam splitters. Although cold-setting resins are sometimes used, they are not suited to mass production because of their long setting time. In these optical parts, different kinds of glass are sometimes combined with each other, but there is little difference in their thermal expansion coefficients. Furthermore, there is no need to strictly control the thickness of the adhesive layer as long as it is kept thin.

Since liquid crystal display panels are required to have uniform electro-optical characteristics, the thickness of the panel should be constant. When combining the two substrates that constitute the liquid crystal display panel, spacers are first spread out between the substrates, and thereafter, liquid crystal is injected into the space between the substrates. It is also necessary to use spacers in the sealing resin, although the sealing portions are not required to transmit light. As the sealing resin, thermosetting epoxy adhesives are usually used in view of the effects on the characteristics and reliability of the liquid crystal display device. In the case of liquid crystal display panels, the substrates to be combined with each other are usually made of the same material, therefore, it is not necessary to consider differences in thermal expansion coefficients.

However, in cases where two substrates with different thermal expansion coefficients are combined with each other by conventional techniques, it is necessary to prevent relaxation of stress, warp and separation of the substrates due to the changes in the thermal environment. Particularly, in cases where a microlens array is combined with a liquid crystal display panel by means of an adhesive, the adhesive will cause changes in the optical characteristics or the non-uniform thickness of the adhesive will cause shifts in the focal distance, so that the effect of prevention of interference, surface reflection, and scattering of light is reduced.

For example, the problems will be discussed which occur in cases where a liquid crystal display panel with borosilicate glass substrates is combined with a flat microlens array with a soda-lime glass substrate.

As mentioned above, the microlens array converges the light incident upon the black matrix portion of the liquid crystal display panel, on the picture elements, so that the brightness of the display image is increased and the equivalent aperture ratio is raised. For the purpose of attaining the greatest possible effect, the microlens array should be combined uniformly with the liquid crystal display panel by adjusting the thickness of the adhesive therebetween so that the focal point of each of the microlenses is positioned in the area of the corresponding picture element.

In the case of a flat microlens array given a refractive index distribution by means of an ion-exchange method, a soda-lime glass containing a great amount of sodium ions is used as the substrate. Since soda-lime glass is not desirable as the substrate of liquid crystal display panels due to the elution of ions to the liquid crystal, which degrades the characteristics of the liquid crystal, borosilicate glass which has a low ion content is used. Since the thermal expansion coefficient of soda-lime glass is $8-10\times10^{-6}$ deg$^{-1}$ and that of borosilicate glass is $4-5\times10^{-6}$ deg$^{-1}$ when a pair of three-inch substrates are combined with each other, a warp of about 0.9 mm will occur at a temperature of 150° C., therefore, the reliability with respect to heat is decreased.

SUMMARY OF THE INVENTION

The image display apparatus of this invention, which overcomes the above-discussed and numerous other disadvantages and deficiencies of the prior art, comprises an optical system including a light source and at least one projection lens; a display means for forming a display image, the display means including a non-luminescent display panel and a microlens array disposed on the light-incidence side of the display panel; and at least one projection lens for projecting the display image; wherein the display panel and the microlens array are combined with each other by means of an adhesive made of a transparent material.

The non-luminescent display panel in a preferred embodiment is a liquid crystal display panel.

The non-luminescent display panel in a preferred embodiment has a plurality of picture elements arranged in a matrix and the microlens array in a preferred embodiment has a plurality of microlenses arranged in a matrix so as to correspond to the picture elements of the display panel.

The above-mentioned microlens array in a more preferred embodiment further has a plurality of color filters arranged so as to correspond to the micro lenses, the color filters being made in at least three primary colors.

The color filters in a still more preferred embodiment are disposed on the light-incidence side of the microlens array.

The color filters in a still more preferred embodiment are disposed on the light-outgoing side of the microlens array.

The color filters in a still more preferred embodiment have a similar shape to that of the microlenses.

The shapes of the above-mentioned microlenses and color filters in a still more preferred embodiment are hexagonal.

The above-mentioned adhesive in a preferred embodiment contains spacers dispersed therein.

Thus, the invention described herein makes possible the objectives of (1) providing a compact, lightweight image display apparatus with significantly improved contrast and brightness of display images; (2) providing an image display apparatus in which the problems of light leakage and mixing of colored light are solved and the light passing through the microlens array and color filter is effectively utilized, thereby attaining further improved contrast and brightness of display images; and (3) providing an image display apparatus in which the substrate of the non-luminescent display panel and the microlens array are combined together without degrading the optical characteristics, and warp or separation does not readily occur and high thermal reliability is attained because the difference in thermal expansion coefficients is reduced.

BRIEF DESCRIPTION OF THE DRAWINGS

This invention may be better understood and its numerous objectives and advantages will become apparent to those skilled in the art by reference to the accompanying drawings as follows.

DESCRIPTION OF THE PREFERRED EMBODIMENTS

EXAMPLE 1

Figure 1:
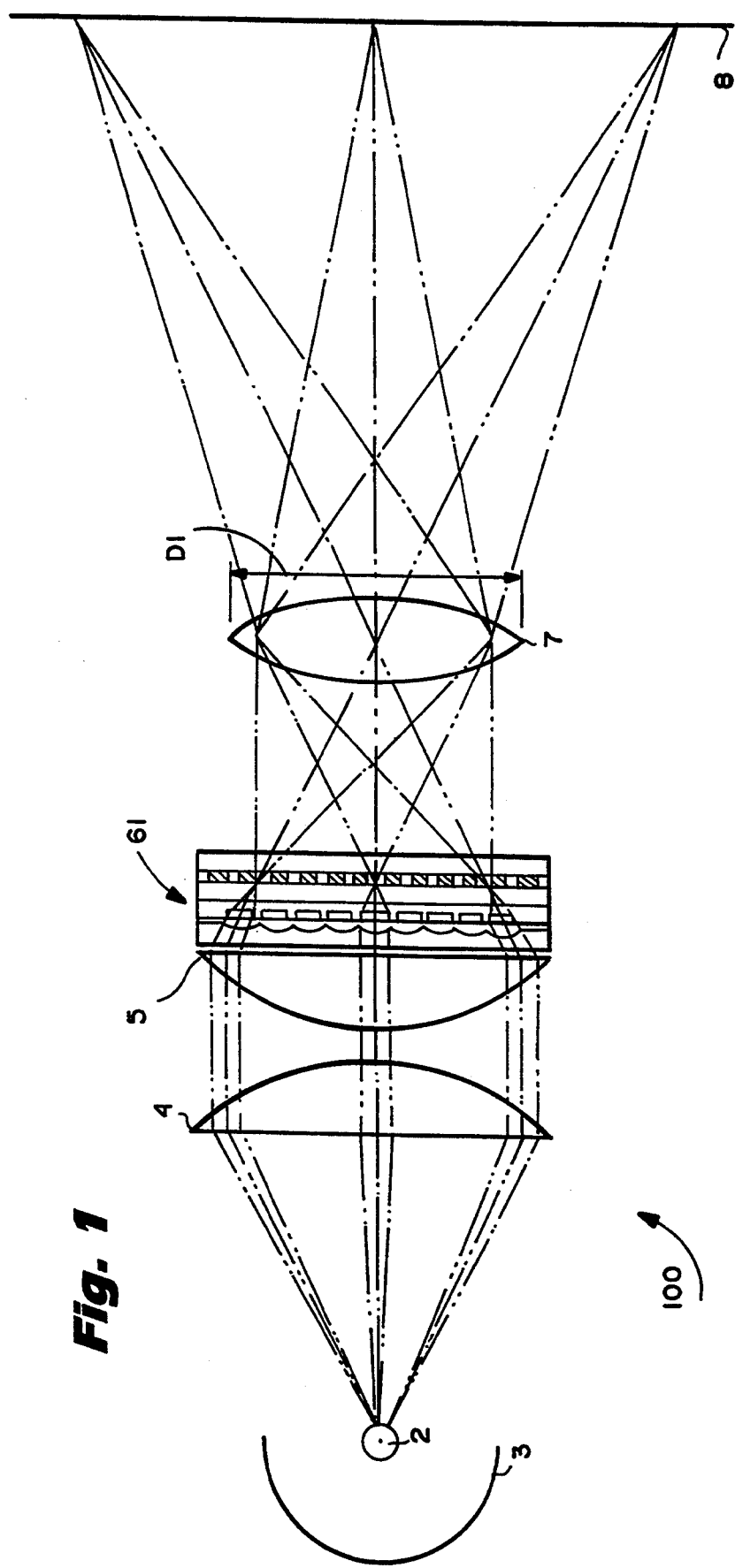
FIG. 1 is a schematic sectional view showing the configuration of an image display apparatus of this invention.

FIG. 1 shows a color image display apparatus of this invention. This color image display apparatus 100 has a light source 2 and a reflecting mirror 3. The light from the light source 2 and the reflecting mirror 3 passes through the condenser lenses 4 and 5 and then enters the display means 61.

The light source 2 is a white light source which can be a halogen lamp, metal halide lamp, or a xenon lamp. The reflecting mirror 3 reflects the light emitted by the light source 2 toward the opposite side and directs the light toward the display means 61. Although Köehler illumination is used in this example, other illumination methods (e.g., critical illumination or telecentric illumination) can also be used.

The light passing through the display means 61 is projected onto the screen 8 by the projection lens 7, resulting in a color image.

Figure 2:
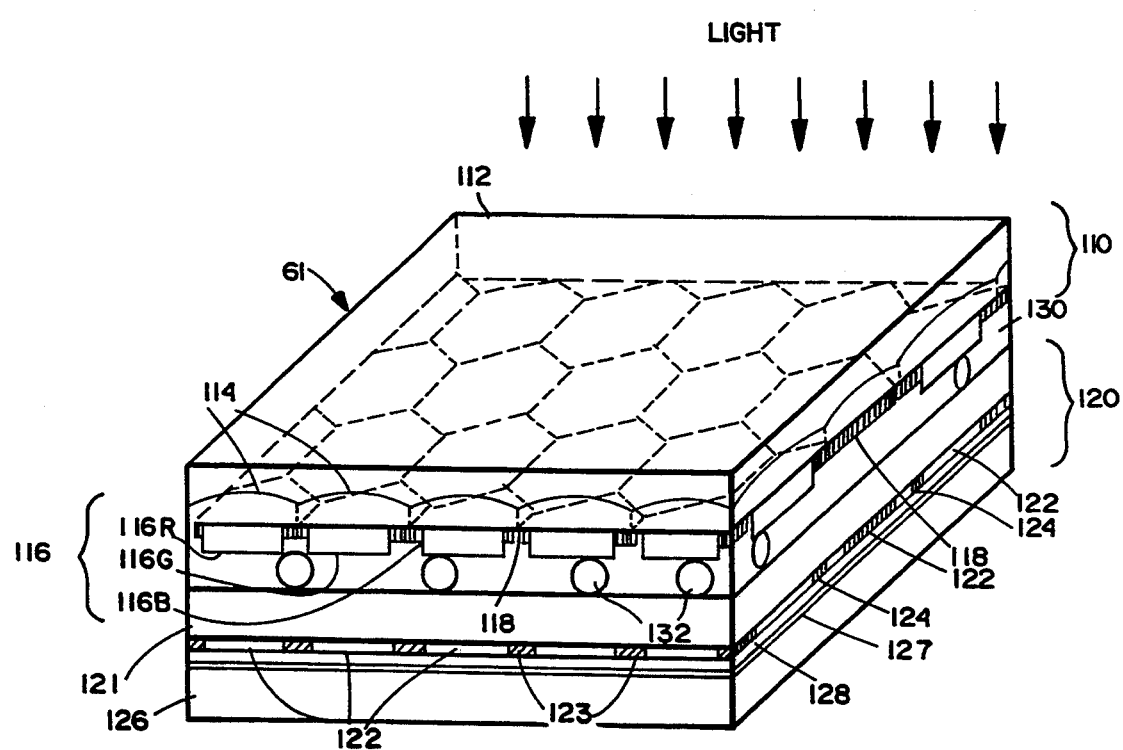
FIG. 2 is an enlarged perspective view showing a part of the display means in the image display apparatus of FIG. 1.

FIG. 2 is an enlarged perspective view showing a part of the display means 61. The display means 61 has a microlens array 110 and a liquid crystal display panel 120, both of which are combined with each other by means of an adhesive layer 130 made from a transparent material. The microlens array 110 is positioned on the light-incidence side of the display means 61.

The surface of the microlens array 110 toward the adhesive layer 130 has three primary-color (red, green, and blue) filters 116 (the respective colors of the filters are indicated by the numbers 116R, 116G, and 116B) corresponding to each of the microlenses formed on the glass substrate 112.

The material used for the color filters 116 is preferably either an inorganic material or an organic material in consideration of resistance to light and heat. Examples of the inorganic material which can be used include an interference filter in which two kinds of oxide films with different refractive indices are alternately formed by electron beam deposition or sputtering. A specific example of an oxide film combination is titanium dioxide ($TiO_2$) and silicon dioxide ($SiO_2$). Here, zirconium dioxide ($ZrO_2$) can be used in place of $TiO_2$ and magnesium fluoride ($MgF_2$) can be used in place of $SiO_2$. A known photolithographic process such as a lift-off technique or a photoetching technique can be used to pattern the interference color filter. Examples of the organic pigment which can be used include a quinacridone red pigment, and phthalocyanine green and blue pigments. These organic pigments are dispersed uniformly in a photosensitive resin which serves as a binder and the predetermined pattern is formed from the mixture by a known photolithographic process.

Light incident upon the microlens array 110 from directions other than the original direction of incidence, or light traveling in directions other than toward the picture element area into which the light is to converge, due to the optical aberrations in the microlenses 114 themselves, may strike the picture element areas corresponding to other color filters 116 as stray light. For the purpose of shading the stray light, a shading mask 118 is provided between the color filters 116. The shading mask 118 is not shown in FIG. 1. The shading mask 118 is formed from a thin film of metal such as chrome, or a black pigment, by a known photolithographic process.

The liquid crystal display panel 120 has the structure described below. The picture element electrodes 122, driving signal lines 123, switching elements (not shown), and scanning signal lines 124 are formed on the glass substrate 121 which is positioned on the light-incidence side. The opposite electrodes 127 are formed over the entire surface of the opposite glass substrate 126 so as to face the picture element electrodes 122. The liquid crystal layer 128 is interposed between the glass substrates 121 and 126. As the material used for the glass substrates 121 and 126, for example, borosilicate glass is used. The picture element electrodes 122 and opposite electrodes 127 are formed from a transparent conductive material such as indium tin oxide (ITO).

In such a liquid crystal display panel the picture element electrodes 122 constitute the transmission areas, while the driving signal lines 123, switching elements, scanning signal lines 124, and the like constitute the shading areas which do not transmit light.

Figure 3:
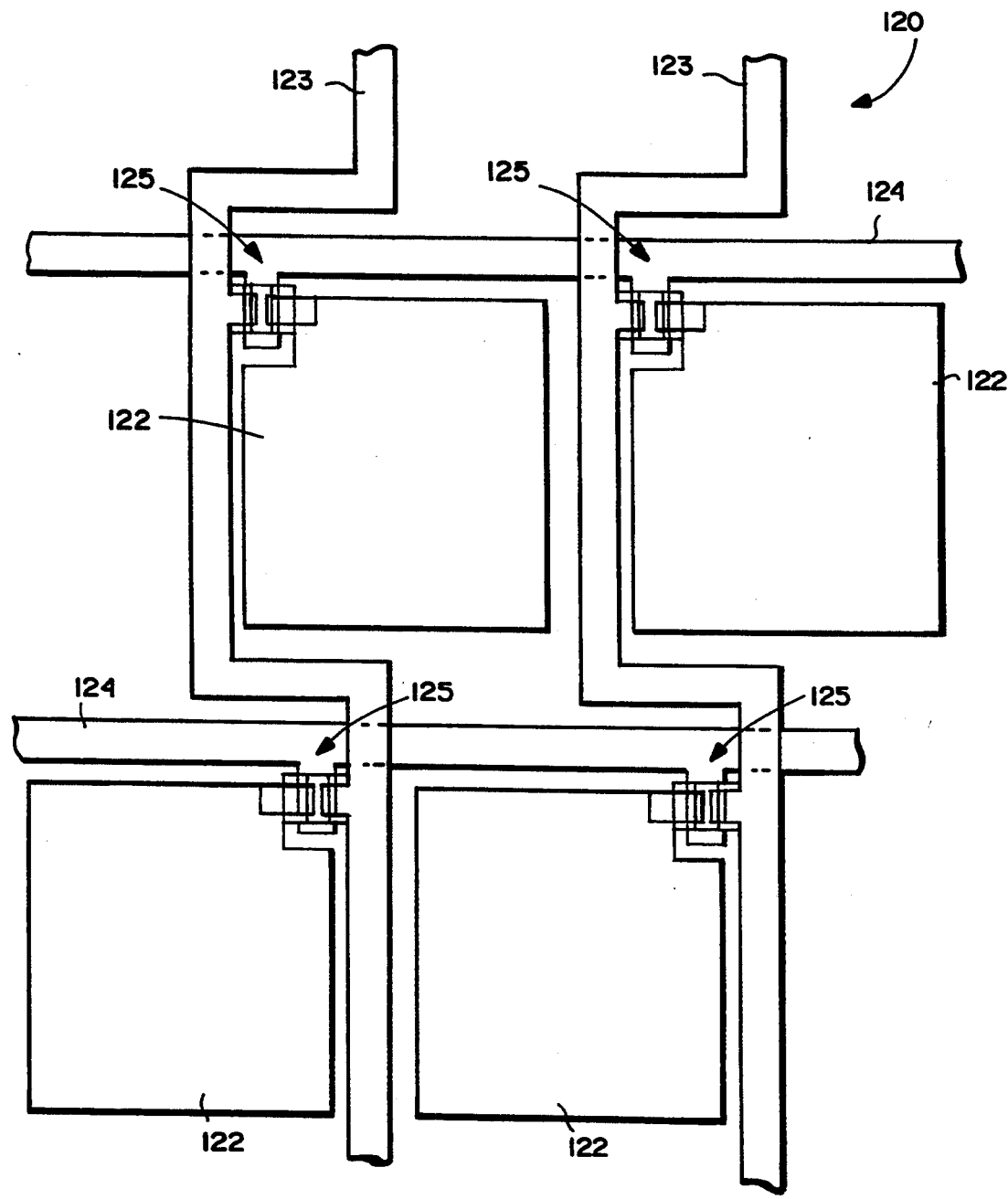
FIG. 3 is an enlarged plan view showing the neighborhood of the picture element electrodes in the liquid crystal display panel of the display means of FIG. 2.

FIG. 3 shows an enlarged plan view showing the neighborhood of the element electrodes 122 which function as the display picture elements of the liquid crystal display panel 120. This liquid crystal display panel 120 can be of the active matrix drive type. As shown in FIG. 3, the picture element electrodes 122 are arranged in a matrix on the glass substrate 121. The driving signals to these picture element electrodes 122 are supplied from the driving signal lines 123 via switching elements 125 such as thin-film transistors (TFTS). By the input of scanning signals from the scanning signal lines 124, these switching elements 125 are switched on and off, which in turn switch the driving signals on and off.

The microlens array 110 is made by injecting sodium ions, for example, into a glass substrate 112 made from soda-lime glass by a selective ion diffusion method or a ion-exchange method so that the glass substrate has an intensity distribution. The areas into which the sodium ions are injected are formed into convex microlenses 114, for example, which have a larger refractive index than that of the glass substrate 112. The microlens array 110 is obtained by arranging these kind of microlenses 114 in a matrix so that they individually correspond to the picture element electrodes 122 in the liquid crystal display panel 120.

The shape of the microlenses 114 is determined so that the light entering from the light source 2 through the condenser lenses 4 and 5 passes through each of the color filters 116 and then strikes the corresponding picture element electrodes 122 of the liquid crystal display panel 120. In this example, the picture element electrodes 122 of the liquid crystal display panel 120 are formed in a delta-shaped matrix, therefore, the shapes of the microlenses 114 and the color filters 116 are both set to be hexagonal.

Figure 4:
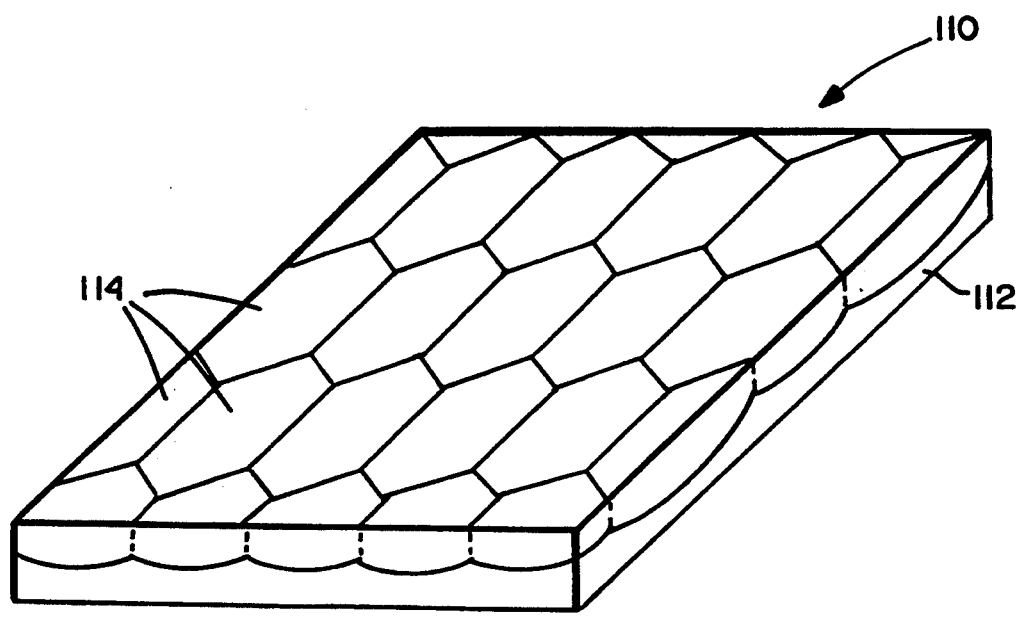
FIG. 4 is a schematic perspective view showing the microlens array of the display means of FIG. 2, as illustrated from the light-outgoing side.

FIG. 4 is a schematic view showing only a part of the microlenses 114 in the microlens array 110, as illustrated from the side of the adhesive layer 130. This figure, however, does not show the color filters 116 nor the shading mask 118. The refractive index of each of the microlenses 114 becomes greater toward the center of the lens. Also, each of the microlenses 114 is fused with the adjacent microlenses 114 at the borderline therebetween. By using such a microlens array 110, light incident upon the shading areas can also be converged on the picture element electrodes 122 of the liquid crystal display panel 120.

After the microlenses 114 and color filters 116 are aligned with the picture element electrodes 122 of the liquid crystal display panel 120, the microlens array 110 is combined with the glass substrate 121 of the liquid crystal display panel 120 by means of an adhesive layer 130 made from a transparent material. Thus, the display means 61 is formed in a single unit.

It is desirable that the transparent material which constitutes the adhesive layer 130 have a refractive index (1.4–1.6) near that of glass and a suitable viscosity (200–300 cps), as well as high adhesive strength. Examples of the transparent material which can be used include synthetic acrylic and epoxy resins such as AVR-100 of Threebond, UV-1003 of Sony Chemical, and NOA-61, 63, and 65 of Norland. Although these transparent materials are synthetic resins which can set under UV irradiation, thermosetting resins can also be used. The thickness of the adhesive layer 124 should be from 10 to 100 microns since separation will readily occurs if less than 10 microns and too much time is required for setting if greater than 100 microns. For example, if the adhesive layer 130 is approximately 100-microns thick, it will set sufficiently in 20 seconds when irradiated by a 250-W high-pressure mercury lamp from a height of 6 cm.

At the portions where the adhesive layer 130 is thin, lack of uniformity in thickness will result in separation, therefore, uniformity should be ensured. In this example, the thickness of the adhesive layer 130 is maintained uniform by mixing an appropriate amount of spacers 132 in the transparent material. The spacers 132 are not shown in FIG. 1.

The spacers 132 are spherical plastic particles in the normal state. The diameter of the spacers 132 is preferably from 10 to 100 microns, and their index of refraction is preferably from 1.4 to 1.6. Spacers 132 are selected which have an expandability and an elastic coefficient lower than that of the transparent material. The mixing ratio of spacers 132 to transparent material is, for example, several to one square millimeter of the adhesive layer 130.

The materials used for spacers 132 can be styrene or acrylic synthetic resins such as Micropearl SP of Sekisui Fine Chemicals and Epostar CP of Nihon Shokubai.

Measurements of the transmittance of light with wavelengths from 400 to 700 nm with respect to the display means 61 in which the thickness of the adhesive layer 130 was 100 microns and the microlens array 110 and liquid crystal display panel 120 were combined with each other as shown in FIG. 2 showed that the reflection loss at the combined surface was 0.1% or less and that scattering due to the spacers 132 was small enough to be ignored in practical use. Also, when combined together at a thickness of 10 microns without using spacers 132, separation occurred at temperatures of 100° C. or less. In contrast, when uniformly combined together using spacers 132 of 10 to 100 microns in diameter, separation did not occur even at a temperature of 150° C. and the combined parts withstood a thermal shock test of 100 cycles from −25° C. to 80° C.

The light which is emitted from the light source 2 and is incident upon the display means 61 via the condenser lenses 4 and 5 is converged on each of the picture element electrodes 122 of the liquid crystal display panel 120 by the microlens array 110, and when passing through the liquid crystal layer 128, the light undergoes intensity modulation corresponding to the driving signal. After passing through the liquid crystal display panel 120, this modulated light is diffused within a circular cone corresponding to a solid angle determined by the aperture ratio established for the microlenses 114. The aperture D1 of the projection lens 7 is selected so that such a bundle of rays from any microlens 114 can be received. By this means, the light passing through the liquid crystal display panel 120 (i.e., display image) is not restricted by the projection lens 7. The display image enlarged by the projection lens 7 is projected on the screen 8.

Since all of the light from the light source 2 passes efficiently through the transmission areas of the liquid crystal display panel 120, the brightness of the image formed on the screen 8 can be improved without significantly increasing the illuminance of the light source 2. Moreover, image display apparatuses can be made more compact and lightweight, as compared with conventional image display apparatuses using three liquid crystal display panels corresponding to the three primary colors (i.e., red, green, and blue).

EXAMPLE 2

Figure 5:
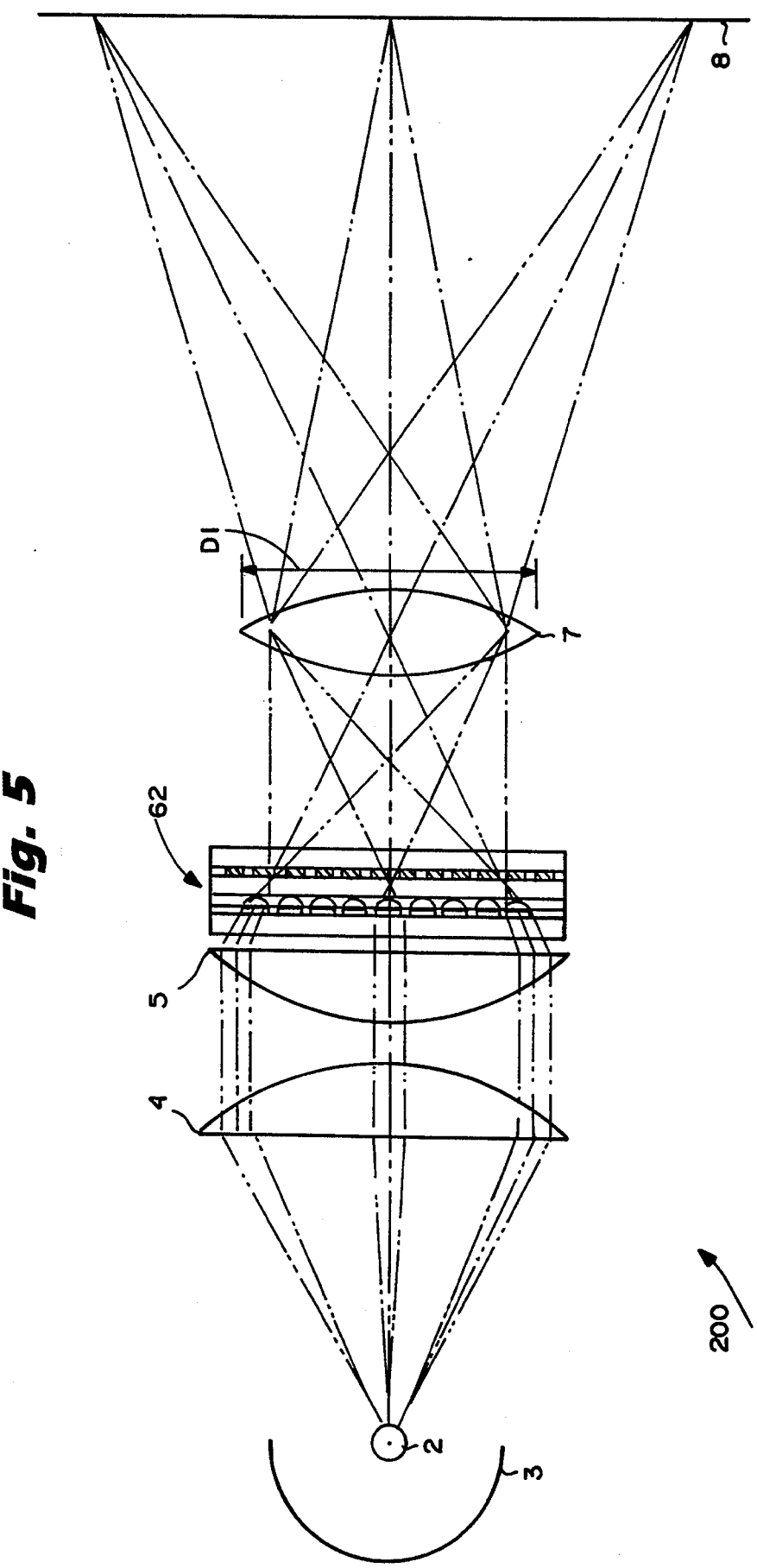
FIG. 5 is a schematic sectional view showing the configuration of another color image display apparatus of this invention.

FIG. 5 shows another color image display apparatus of this invention. This color image display apparatus 200 is the same as that obtained in Example 1, except for the structure of the microlens array of the display means 62. Moreover, unless otherwise indicated, the materials used for each part and the method for producing the image display apparatus are the same as those used in Example 1.

Figure 6:
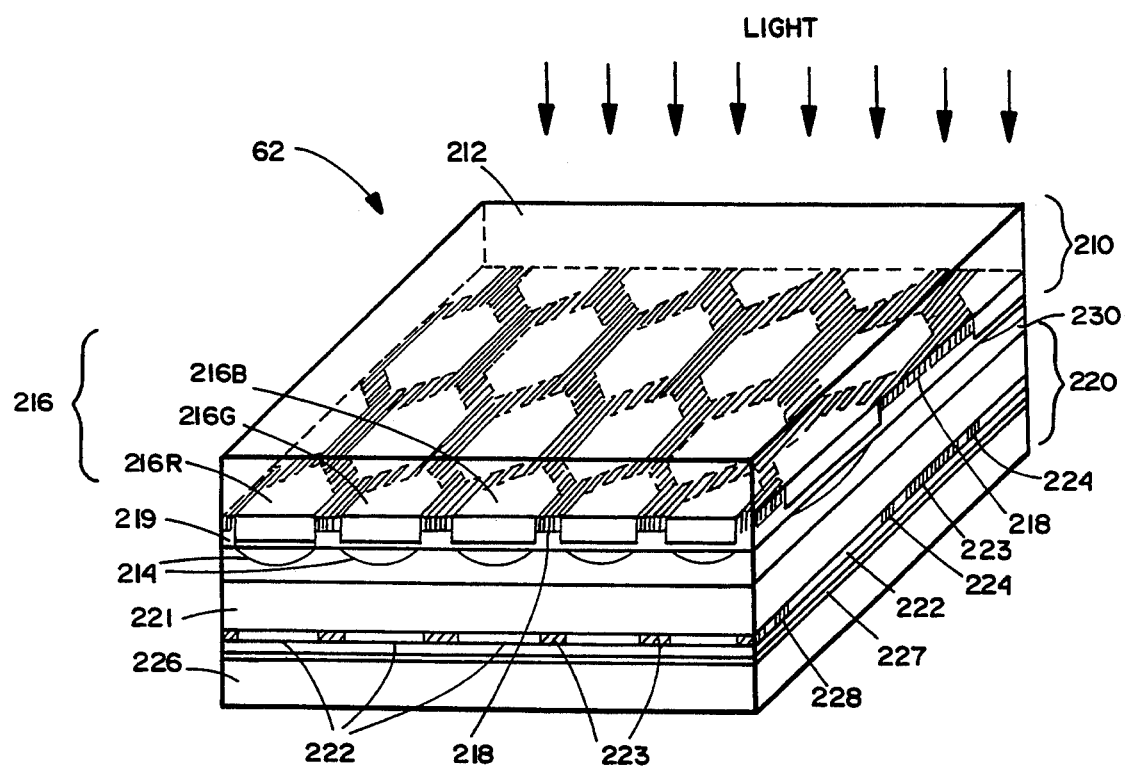
FIG. 6 is an enlarged perspective view showing a part of the display means in the image display apparatus of FIG. 5.

FIG. 6 is an enlarged perspective view showing a part of the display means 62. The display means 62 has a microlens array 210 and a liquid crystal display panel 220, both of which are combined with each other by means of an adhesive layer 230 made from a transparent material. The microlens array 210 is positioned on the light-incidence side of the display means 69. As can be seen from FIG. 6, the microlens array 210 of this example differs from that used in Example 1 in that the positional relationship of the microlens and color filter is reversed with respect to the direction of light incidence. The surface of the microlens array 210 toward the adhesive layer 230 has microlenses 214 corresponding to the three primary color (red, green, and blue) filters 216 (the respective colors of the filters may be indicated by the numbers 216R, 216G, and 216B) formed on the glass substrate 212. In this example, a shading mask 218 is also provided between the color filters 216. The shading mask 218 is not shown in FIG. 5.

The liquid crystal display panel 220 has the same structure as that of the liquid crystal display panel 120 used in Example 1. The picture element electrodes 222, driving signal lines 223, switching elements (not shown), and scanning signal lines 224 are formed on the glass substrate 221 positioned on the light-incidence side. The opposite electrodes 227 are formed over the entire surface of the opposite glass substrate 226 so as to face the picture element electrodes 222. The liquid crystal layer 228 is disposed between the glass substrates 221 and 226.

In such a liquid crystal display panel 220, the picture element electrodes 222 constitute the transmission areas, while the driving signal lines 223, switching elements, and scanning signal lines 224 constitute the shading areas which do not transmit light.

The display means 62 is produced as follows. First, color filters 216 are formed on the glass substrate 212 in the predetermined pattern of the three primary colors (i.e., red, green, and blue) so that the color filters 216 individually correspond to the picture element electrodes 222 of the liquid crystal display panel 220. These color filters 216 are formed by applying a synthetic resin containing pigment dispersed therein, or by selectively depositing an interference filter through sputtering, which contains a plurality of oxide films with different refractive indices.

A transparent resin layer 219 is then formed on the glass substrate 212 with the color filters 216, and after the surface is flattened, the substrate 212 is baked. A thermoplastic resin with a relatively high refractive index is selectively applied to the surface of the transparent resin layer 219 corresponding to the positions of the color filters 216, and then the thermoplastic resin is heated to a temperature above its softening point to form the convex lenses.

In this way, the microlens array 210 is obtained by arranging the microlenses 214 in a matrix so that the microlenses 214 individually correspond to the picture element electrodes 222 in the liquid crystal display panel 220.

The shape of the microlenses 214 is determined so that the light entering from the light source 2 through the condenser lenses 4 and 5 passes through each of the color filters 216 and then strikes the picture element electrodes 222 of the liquid crystal display panel 220. In this example, the picture element electrodes 222 of the liquid crystal display panel 220 are formed in a delta-shaped matrix, therefore, the shapes of the microlenses 214 and the color filters 216 are both set to be hexagonal. With the use of microlens array 210, the light incident upon the color filters 216 can also be effectively converged on picture element electrodes 222 of the liquid crystal display panel 220.

After the microlenses 214 and color filters 216 are aligned with the picture element electrodes 222 of the liquid crystal display panel 220, the microlens array 210 is combined with the glass substrate 221 of the liquid crystal display panel 220 by means of an adhesive layer 230 made from a transparent material. Thus, the display means 62 is formed in a single unit. In this example, it is not necessary to mix any spacers in the adhesive layer 230.

The light which is emitted from the light source 2 and is incident upon the display means 62 via the condenser lenses 4 and 5 is colored by each color filter 216 of the microlens array 210 and converged on each of the picture element electrodes 222 of the liquid crystal display panel 220 by each microlens 214. When passing through the liquid crystal layer 228, the light undergoes intensity modulation corresponding to the driving signal. After passing through the liquid crystal display panel 220, this modulated light is diffused within a circular cone corresponding to a solid angle determined by the aperture ratio established for the microlenses 214. The aperture D1 of the projection lens 7 is selected so that such a bundle of rays from any microlens 214 can be received.

By this means, the light passing through the liquid crystal display panel 220 (i.e., display image) is not restricted by the projection lens 7. The display image enlarged by the projection lens 7 is projected on the screen 8.

Since all of the light from the light source 2 passes efficiently through the transmission areas of the liquid crystal display panel 220, the brightness of the image formed on the screen 8 can be improved without significantly increasing the illuminance of the light source 2. Moreover, image display apparatuses can be made more compact and lightweight, as compared with conventional image display apparatuses using three liquid crystal display panels corresponding to the three primary colors (i.e., red, green, and blue).

EXAMPLE 3

Figure 7:
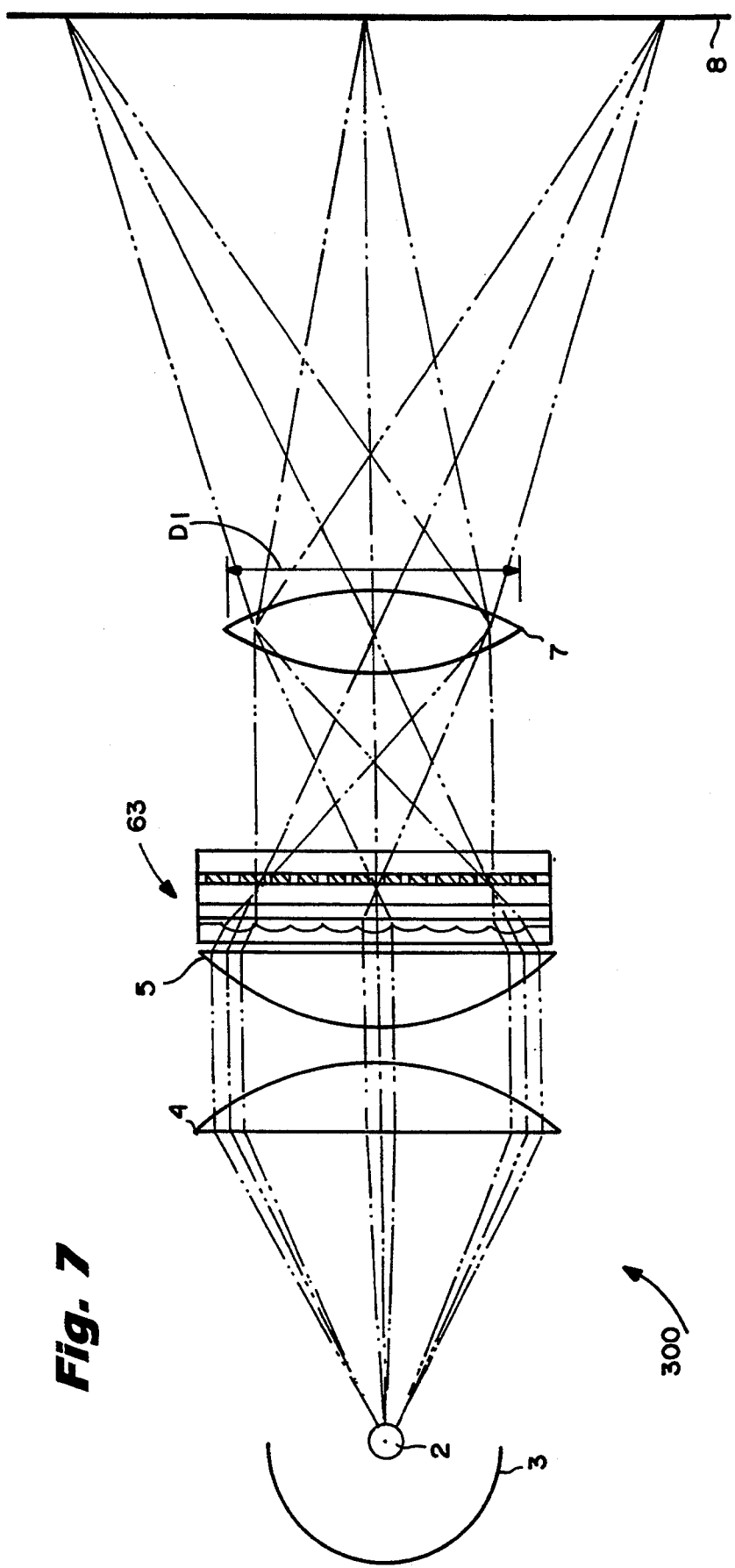
FIG. 7 is a schematic sectional view showing the configuration of a monochromatic image display apparatus of this invention.
Figure 8:
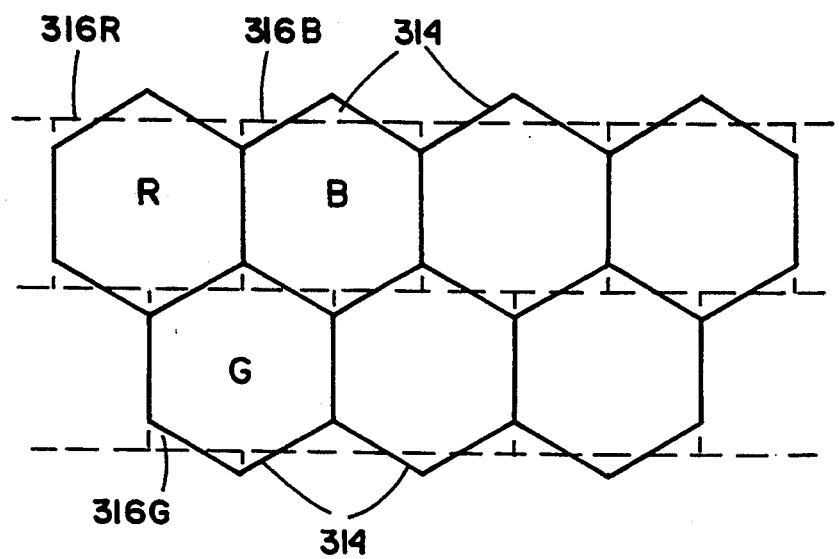
FIG. 8 is a schematic view showing the relationship between the shapes of the microlens and color filters in a conventional image display apparatus.

FIG. 7 is a schematic sectional view showing the configuration of a monochrome image display apparatus of this invention. The monochrome image display apparatus 300 is the same as the color image display apparatus of Example 1, except that the microlens array of the display means 63 does not have a color filter.

Although in the above-mentioned examples, liquid crystal display panels were used as the non-luminescent display panels, other non-luminescent display panels such as electrochromic display panels or transmissive-type ceramic display panels can also be used.

Moreover, the shape of each of the microlenses in the microlens array can be selected so as to correspond to the picture element matrix in the non-luminescent display panel; that is, it may be circular, rectangular, hexagonal, or other polygonal shape. Furthermore, the shape of the color filters should preferably be the same as that of the microlenses.

It is understood that various other modifications will be apparent to and can readily be made by those skilled in the art without departing from the scope and spirit of this invention. Accordingly, it is not intended that the scope of the claims appended hereto be limited to the description as set forth herein, bet rather that the claims be construed as encompassing all the features of patentable novelty that reside in the present invention, including all features that would be treated as equivalents thereof by those skilled in the art to which this invention pertains.

What is claimed is:

1. An image display apparatus comprising: an optical system including a light source and at least one projection lens; a display means for forming a display image, said display means including a liquid crystal display panel disposed on a substrate and a microlens array disposed on the light-incidence side of said display panel, wherein said display panel has a plurality of picture elements arranged in a delta-shaped matrix and said microlens array includes a plurality of microlenses arranged in a delta-shape so as to correspond to the picture elements of said display panel and includes a plurality of color filters formed independently of the microlenses and arranged at positions corresponding to the microlenses, said color filters being made in at least three primary colors and being disposed on said microlens array; and at least one projection lens for projecting the display image; wherein said display panel and said microlens array are combined with each other by means of an adhesive made of a transparent material having a refractive index which is virtually equal to that of the microlenses and that of the display panel substrate.

2. An image display apparatus according to claim 1, wherein the color filters have a similar shape to that of the microlenses.

3. An image display apparatus according to claim 1, wherein the shapes of the microlenses and color filters are hexagonal.

4. An image display apparatus according to claim 1, wherein the adhesive contains spacers dispersed therein.

5. An image display apparatus according to claim 4, wherein said spacers have a lower elastic constant than that of said adhesive.

6. An image display apparatus according to claim 1, wherein said color filters are formed on the light-incidence side of said microlens array.

7. An image display apparatus according to claim 1, wherein said color filters are formed on the light-outgoing side of said microlens array.

8. An image display apparatus according to claim 1, wherein said microlens array is a refractive index distribution type microlens array.

* * * * *